United States Patent [19]

Pano et al.

[11] Patent Number: 4,938,640
[45] Date of Patent: Jul. 3, 1990

[54] METAL CUTTING TOOL

[75] Inventors: Joseph Pano, Shave Zion, Israel; Hans Braun, Hagen, Fed. Rep. of Germany

[73] Assignee: Iscar, Ltd., Migdal Tefen, Israel

[21] Appl. No.: 336,216

[22] Filed: Apr. 11, 1989

Related U.S. Application Data

[63] Continuation-in-part of Ser. No. 94,692, Sep. 9, 1987.

[30] Foreign Application Priority Data

Sep. 10, 1986 [DE] Fed. Rep. of Germany ....... 3630845
Oct. 15, 1986 [DE] Fed. Rep. of Germany ....... 3635052

[51] Int. Cl.⁵ .................... B23B 27/06; B23B 27/08; B23B 29/06; B23B 29/08
[52] U.S. Cl. ........................................ 407/110; 407/117
[58] Field of Search ...................... 82/158; 407/42, 50, 407/51, 106, 107, 109, 110, 111, 117

[56] References Cited

U.S. PATENT DOCUMENTS

| 4,558,974 | 12/1985 | Pano | 407/110 |
| 4,778,311 | 10/1988 | Niemi | 407/117 |
| 4,801,224 | 1/1989 | Petterson et al. | 407/117 |
| 4,834,592 | 5/1989 | Niebauer et al. | 407/117 |

Primary Examiner—William Terrell
Attorney, Agent, or Firm—Ladas & Parry

[57] ABSTRACT

A metal cutting tool for turning, cutting off, grooving, chamfering and end facing operations. A cutting insert is clamped in a slot in a tool holder by a resiliently pivoting jaw. The tool and holder have complementary longitudinal keying ribs and grooves and a mating transverse projection and recess for resisting forces in both direction.

8 Claims, 1 Drawing Sheet

METAL CUTTING TOOL

This is a Continuation in-part of application Ser. No. 07/094,672, filed Sept. 9, 1987.

FIELD OF THE INVENTION

This invention relates to a metal cutting tool and is particularly concerned with metal cutting tools of the kind wherein a cutting insert is replaceably retained in a tool holder and which is used, e.g. in turning, parting, grooving, chamfering and end facing operations. Such cutting inserts should be capable of ready insertion and replacement and should be firmly held in the tool holder in a required, predetermined position.

BACKGROUND OF THE INVENTION

Various proposals have been made in the past to meet these requirements and in this connection attention is particularly directed to the Assignee's U.S. prior patent No. 3,894,322 and European patent specification No. 82300954.3. In both cases the insert is held between jaws formed integrally with the tool holder but whilst in the former case the jaws are screw biased into clamping the insert, in the latter case a wedge shaped insert is frictionally held within a wedge shaped slot defined between the jaws. The continguous surfaces of the slot and the insert are formed with elongated keying arrangements so as to inhibit transverse movement of the insert retained within the slot in a direction transverse thereto. The European patent specification furthermore discloses the provision of the insert with an abutment shoulder which limits the degree of insertion of the insert into the holder. Whilst such hitherto proposed systems are in general effective in retaining the insert in its cutting position under the normal inwardly and laterally directing forces which act on the insert during cutting, it has been found that outward displacement of the insert may take place when traction forces are exerted thereon. Such traction forces may arise in the course of various cutting operations such as, for example, during the internal chamfering of a pipe edge.

SUMMARY OF THE INVENTION

It is therefore an object of the present invention to provide a metal cutting tool in which the above referred to disadvantage is substantially reduced.

According to the present invention there is provided a metal cutting tool comprising:
an elongated cutting insert;
a cutting edge of said insert;
a pair of longitudinally directed clamping surfaces of said insert having respectively formed therein a pair of elongated keying grooves;
an insert holder;
a pair of clamping jaws of said holder;
a pair of oppositely facing clamping surfaces of said jaws having respectively formed therein a pair of elongated keying ribs and defining between them an insert seat within which said insert is to be located with the keying ribs respectively located within the keying grooves;
an arched projection extending out of and across a second one of said jaws adjacent a free end thereof and a correspondingly arched recess formed in and extending across a base surface of said insert adjacent a leading end thereof, into which recess said projection is adapted to fit, said keying ribs extending into an outer surface of said projection and said keying groove extending into the surface of said recess; and
jaw displacing means for displacing a first of said jaws from a first position, wherein the spacing between said jaws allows for the ready insertion of the insert into said insert seat without relative displacement of said jaws, to a second position, wherein said insert is firmly clamped between said jaws with said keying ribs located in said keying grooves and with said arched projection located in said arched recess.

In accordance with a preferred embodiment of the invention, leading surfaces of said recess and projection are of respectively extended length as compared with respective trailing surfaces thereof and are adapted to abut each other.

The first jaw is formed integrally with said holder and is resiliently displaceable by said jaw displacing means from said first to said second position.

Thus, with a cutting tool in accordance with the invention, when the jaws have been displaced into clamping the insert the projection and recess means mate firmly and in this way the insert is firmly retained in position both against withdrawal, as a result of possible traction forces, and also against excessive insertion under inwardly directed forces.

BRIEF DESCRIPTION OF THE DRAWINGS

A preferred embodiment of the invention will now be described by way of example and with reference to the accompanying drawings in which:

FIG. 3 is a cross-sectional view of a cutting insert forming part of the tool shown in FIGS. 1 and 2;

Figure 1:
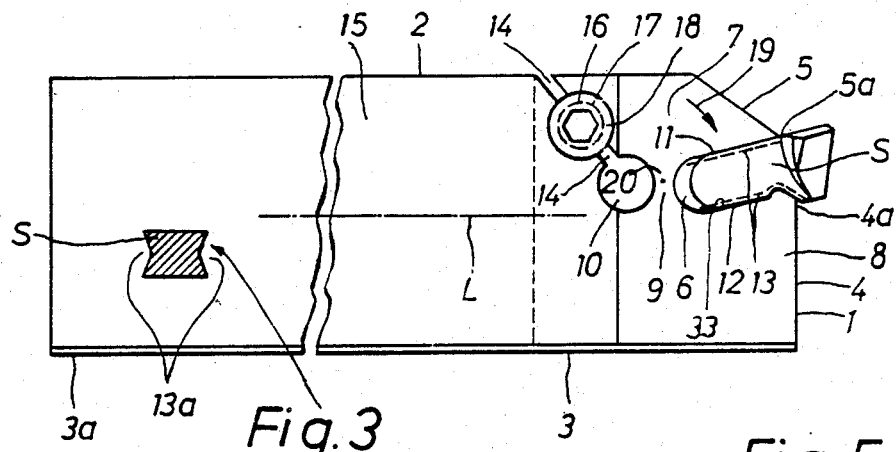
FIG. 1 is a side elevation of a metal cutting tool in accordance with the invention.

As seen in the drawings, the metal cutting tool comprises a flat, substantially rectangular holder 1. Formed integrally with one end of the holder 1 is a pair of clamping jaws 2 and 3 having opposed clamping surfaces 2a and 3a which have a convex V-shaped cross-sectional form and which define between them an insert seat 4. The upper jaw 2 is bounded by an edge 5 which slopes away from a corresponding edge 6 of the lower jaw.

Formed in the holder 1, adjacent to and extending away from the insert seat 4, is an elongated slot 7 which extends from the upper edge 8 of the holder towards the inner end of the seat 4 and is formed at its innermost end, adjacent the seat 4 and also at an intermediate position, with elongated circular apertures 9 and 10, the two apertures communicating via an intermediate portion of the slot 7. The slot 7 as a whole is disposed at an acute angle (preferably 45°) with respect to a longitudinal axis L of the holder 1.

Fitted within the aperture 10 is a rotary expanding element 11 through which passes a screw 12, the arrangement being such that upon rotation of th screw 12 in a first sense the expanding element 11 is displaced so as, in turn, to displace the upper jaw 2 in the direction of the arrow 13 into an insert clamping position. During the displacement of the upper jaw 2, it effectively rotates in a clockwise direction about a connecting portion 14 of the holder between the inner end of the seat 4 and the adjacent circular aperture 9. Upon rotation of the screw 12 in the opposite sense, the expanding element 11 is so displaced as to allow the upper jaw 2 to spring back into its non-clamping position.

The lower jaw edge 6 has formed adjacent the outer end thereof, a substantially triangularly shaped abutment 15 which is directed inwardly with respect to the insert seat 4. the abutment having a trailing edge 16 and a leading edge 17 which is of extended length as compared with that of the trailing edge 16. The abutment 15 has an upper surface which is of V-shaped cross-sectional shape forming a continuation of the lower jaw edge.

A cutting insert 18 comprises a cutting head 19 and an elongated body 20. The cutting head is formed with a pair of leading cutting edges 21 which are disposed at an acute angle α with respect to a median line E of the cutting insert 18. The cutting head is furthermore formed with a pair of trailing cutting edges 22 which are disposed at an obtuse angle β with respect to the median line E. The cutting insert body 20 is formed with upper and lower edges 23 and 24 which are of respectively concave V-shaped cross-sectional shape and in which the corresponding V-shaped upper and lower jaw edges are adapted to be keyed. Formed in the lower insert edge adjacent the cutting insert head 19 is a triangularly shaped recess 25 which is formed with a trailing recess edge 26 and a leading recess edge 27 which is of extended length as compared with the length of the trailing edge 26. The recess edges 26 and 27 are formed with a concave V-shaped cross-sectional which are continuations of the lower insert edge 24.

Figure 5:
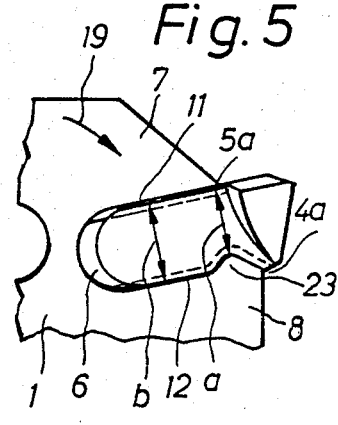
FIG. 5 is a side elevation of a front end of the tool shown in FIGS. 1 and 2 after insertion of the cutting insert and prior to the biasing of the tool jaws into clamping the insert.
Figure 6:
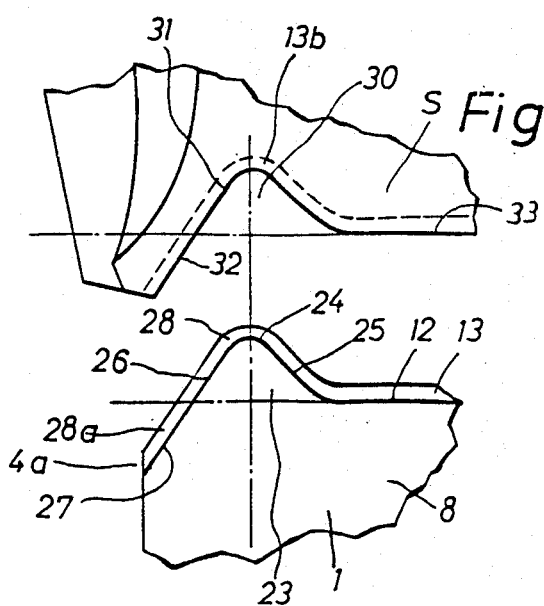
FIG. 6 is an enlarged view of corresponding portions of the cutting insert and tool holder shown spaced apart.
Figure 4:
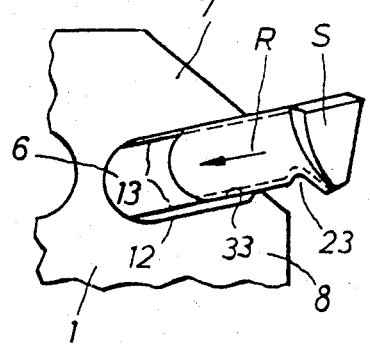
FIG. 4 is a side elevation of a front end of the tool shown in FIGS. 1 and 2 during insertion of the cutting insert.

Reference to FIG. 5 will show that the minimum transverse spacing a of the insert seat (between the tip of the abutment 15 and the opposite upper jaw edge 5) is equal to or greater than the maximum width b of the insert body 20. In consequence, therefore, and with the upper jaw 2 in its non-clamping position as shown in FIG. 4, it is possible simply to slide the insert 18 into the seat 4 in the direction of the arrow R, as shown in FIG. 4, until the abutment 15 is located opposite the recess 25 and the extended leading edge 17 of the abutment bears against the extended leading edge 27 of the recess. With the insert in this position, the screw 12 is now rotated, causing the rotary expanded element 11 to be displaced and this in turn displaces the upper jaw 7 into its clamping position in which the abutment 15 mates firmly within the recess 25 as seen in FIG. 5. When so clamped, the insert is firmly fixed in position both as regards possible further insertion into the seat and also as regards possible outward displacement under traction forces. These traction forces can particularly arise with an insert, of the kind just described, when it is used for chamfering the spaced-apart opposite edges of a parted pipe. Thus, whilst the cutting edges 21 can be used to chamfer the edge of one pipe, the trailing cutting edges 22 are used to chamfer the opposite edges of the other pipe and in the latter case, chamfering is accompanied by a traction force exerted on the insert. The provision of the mating abutment and recess ensures that in neither case is the insert displaced.

Preferably, the leading edges 17 and 21 of the insert 18 and the seat 4 are directed substantially normally to the resultant direction of the forces acting on the insert during cutting.

Figure 2:
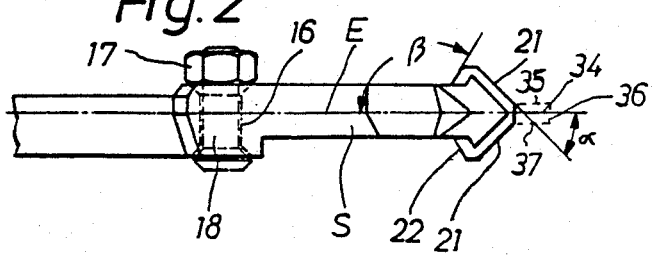
FIG. 2 is a plan view from above of a portion of the tool shown in FIG. 1.

Optionally, and as is shown in dotted lines in FIG. 2 of the drawings, the insert can be provided with an additional cutting element 28.

Whilst the invention has been specifically described with reference to a cutting insert specifically designed for use in chamfering, it will be readily appreciated that the invention is equally applicable to other forms of cutting inserts where traction forces are generated during cutting.

We claim:

1. A metal cutting tool comprising:
   an elongated cutting insert;
   a leading end of said insert;
   a pair of longitudinally directed clamping surfaces of said insert having respectively formed therein a pair of elongated keying grooves;
   an insert holder;
   a pair of clamping jaws of said holder;
   a pair of oppositely facing clamping surfaces of said jaws having respectively formed therein a pair of elongated keying ribs and defining between them an insert seat within which said insert is to be located with the keying ribs respectively located within the keying grooves;
   an arched projection extending out of and across a second one of said jaws adjacent a free end thereof and a correspondingly arched recess formed in and extending across a base surface of said insert adjacent the leading end thereof, into which recess said projection is adapted to fit, said keying ribs extending into an outer surface of said projection and said keying groove extending into the surface of said recess; and
   jaw displacing means for displacing a first of said jaws from a first position, wherein the spacing between said jaws allows for the ready insertion of the insert into said insert seat without relative displacement of said jaws, to a second position, wherein said insert is firmly clamped between said jaws with said keying ribs located in said keying grooves and with said arched projection located in said arched recess.

2. A cutting tool according to claim 1 wherein said first jaw is formed integrally with said holder and is resiliently displaceable by said jaw displacing means from said first to said second position.

3. A cutting tool according to claim 1 wherein said projection and said recess are of substantially triangular cross-sectional shape.

4. A cutting tool according to claim 3 wherein leading surfaces of said recess and projection are of respectively extended length as compared with respective trailing surfaces thereof and meet with each other.

5. A cutting tool according to claim 4 wherein said leading surfaces are directed substantially normal to the resultant direction of forces acting on said insert during cutting.

6. A cutting tool according to claim 1 wherein said recess of said cutting insert is of substantially triangular shape.

7. A cutting tool according to claim 6 wherein a leading surface of said recess of said cutting insert is of extended length as compared with a trailing surface thereof.

8. A cutting tool according to claim 6 for use in internal and external chamfering of pipe ends wherein said terminal leading end comprises a first, leading pair of cutting edges and a second, trailing pair of cutting edges which are symmetrically disposed with respect to a median longitudinal plane of said body portion and at acute angles with respect thereto, said first and second parts sloping away from said median lines respectively from and towards the leading end of the insert.

* * * * *